(12) United States Patent
Boblett et al.

(10) Patent No.: US 10,901,515 B2
(45) Date of Patent: *Jan. 26, 2021

(54) VEHICULAR INTERFACE SYSTEM FOR LAUNCHING AN APPLICATION

(71) Applicant: Tesla, Inc., Palo Alto, CA (US)

(72) Inventors: Brennan Boblett, San Francisco, CA (US); Nalinichandra Penke, Fremont, CA (US); Roy Goldman, Cupertino, CA (US); Michael Fairman, Santa Cruz, CA (US); Kevin Hsieh, Emerald Hills, CA (US)

(73) Assignee: Tesla, Inc., Palo Alto, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 16/030,157

(22) Filed: Jul. 9, 2018

(65) Prior Publication Data

US 2018/0314342 A1  Nov. 1, 2018

Related U.S. Application Data

(63) Continuation of application No. 13/765,363, filed on Feb. 12, 2013, now Pat. No. 10,019,066, which is a
(Continued)

(51) Int. Cl.
*G06F 3/00* (2006.01)
*G06F 9/00* (2006.01)
(Continued)

(52) U.S. Cl.
CPC .......... *G06F 3/017* (2013.01); *B60G 17/015* (2013.01); *B60J 7/043* (2013.01); *G01C 21/3667* (2013.01);
(Continued)

(58) Field of Classification Search
CPC .......... G06F 3/017; G06F 9/4443; G06F 8/34; G06F 3/0486; G06F 8/38; G06F 3/0481;
(Continued)

(56) References Cited

U.S. PATENT DOCUMENTS

| | | |
|---|---|---|
| 4,866,776 A | 9/1989 | Kasai |
| 5,083,275 A | 1/1992 | Kawagoe et al. |

(Continued)

FOREIGN PATENT DOCUMENTS

| | | |
|---|---|---|
| EP | 1 028 011 | 8/2000 |
| EP | 2 840 215 | 2/2015 |

(Continued)

OTHER PUBLICATIONS

International Application No. PCT/US2013/055595, International Search Report dated Jan. 24, 2014, 5 pages.
(Continued)

*Primary Examiner* — Kieu D Vu
*Assistant Examiner* — Anita D. Chaudhuri
(74) *Attorney, Agent, or Firm* — Knobbe, Martens, Olson & Bear, LLP

(57) ABSTRACT

A vehicular interface system for providing application-based access to a plurality of vehicular subsystems is disclosed. The vehicular interface system includes a display for displaying a graphical user interface (GUI). A taskbar is displayed in a first portion of the GUI, the taskbar including a plurality of icons, each of icons representing a corresponding application. A plurality of windows is displayed in a second portion of the GUI. When determining that a user-selected icon is being dragged from an initial location on the taskbar, a semi-transparent overlay, corresponding to the application to be launched, is displayed on a window of the GUI as the selected icon is being dragged within the window. When determining that the selected icon is released
(Continued)

within a selected window, the corresponding application is launched in the selected window. In general, the application provides control options or monitoring information relating to a subsystem of a vehicle.

20 Claims, 19 Drawing Sheets

Related U.S. Application Data continuation of application No. 13/764,942, filed on Feb. 12, 2013, now Pat. No. 10,180,727.

(60) Provisional application No. 61/706,915, filed on Sep. 28, 2012.

(51) Int. Cl.
*G06F 17/00* (2019.01)
*G06F 3/01* (2006.01)
*G06F 3/0488* (2013.01)
*G01C 21/36* (2006.01)
*G06F 3/0481* (2013.01)
*H04S 7/00* (2006.01)
*G06F 3/0484* (2013.01)
*B60G 17/015* (2006.01)
*B60J 7/043* (2006.01)

(52) U.S. Cl.
CPC ....... *G01C 21/3697* (2013.01); *G06F 3/0488* (2013.01); *G06F 3/04817* (2013.01); *G06F 3/04842* (2013.01); *G06F 17/00* (2013.01); *H04S 7/303* (2013.01)

(58) Field of Classification Search
CPC .. G06F 3/0482; G06F 3/04847; G06F 3/0488; G06F 3/04817; G06F 3/04842; G06F 17/00; B60G 17/015; B60J 7/043; G06Q 10/10; G01C 21/3667; G01C 21/3697; H04S 7/303; H04N 1/00411; H04N 1/00389
See application file for complete search history.

(56) References Cited

U.S. PATENT DOCUMENTS

| | | | |
|---|---|---|---|
| 5,271,063 A | 12/1993 | D'Alayer De Costemore D'Arc | |
| 5,491,795 A | 2/1996 | Beaudet | |
| 5,754,174 A | 5/1998 | Carpenter | |
| 5,790,120 A | 8/1998 | Lozares | |
| 5,933,597 A | 8/1999 | Hogan | |
| 6,043,818 A | 3/2000 | Nakano | |
| 6,204,847 B1 | 3/2001 | Wright | |
| 6,454,341 B2 | 9/2002 | Tolinski | |
| 7,707,514 B2* | 4/2010 | Forstall | G06F 3/04817 715/810 |
| 8,095,278 B2 | 1/2012 | Schaaf | |
| 8,239,087 B2 | 8/2012 | Dybalski et al. | |
| 8,434,019 B2 | 4/2013 | Nelson | |
| 9,045,025 B1 | 6/2015 | Greene et al. | |
| 10,019,066 B2 | 7/2018 | Boblett et al. | |
| 10,180,727 B2 | 1/2019 | Boblett et al. | |
| 2001/0043198 A1 | 11/2001 | Ludtke | |
| 2002/0054133 A1 | 5/2002 | Jameson | |
| 2003/0070437 A1 | 4/2003 | Hafner et al. | |
| 2005/0105744 A1 | 5/2005 | Lee | |
| 2005/0110229 A1 | 5/2005 | Kimura et al. | |
| 2005/0135636 A1 | 6/2005 | Putti | |
| 2005/0152562 A1 | 7/2005 | Holmi et al. | |
| 2005/0210406 A1 | 9/2005 | Biwer | |
| 2005/0254775 A1 | 11/2005 | Hamilton | |
| 2005/0261822 A1 | 11/2005 | Wako | |
| 2005/0271219 A1 | 12/2005 | Bruelle-Drews | |
| 2005/0280524 A1 | 12/2005 | Boone | |
| 2006/0036962 A1 | 2/2006 | Jobs et al. | |
| 2006/0101352 A1 | 5/2006 | Kohar | |
| 2006/0155429 A1 | 7/2006 | Boone et al. | |
| 2006/0195232 A1 | 8/2006 | Obradovich | |
| 2006/0262935 A1 | 11/2006 | Goose | |
| 2007/0101297 A1 | 5/2007 | Forstall | |
| 2007/0198948 A1 | 8/2007 | Toriyama | |
| 2007/0234223 A1* | 10/2007 | Leavitt | B60K 37/06 715/762 |
| 2008/0016456 A1 | 1/2008 | Friedland | |
| 2008/0034309 A1 | 2/2008 | Louch | |
| 2008/0207188 A1 | 8/2008 | Ahn | |
| 2008/0297483 A1 | 12/2008 | Kim | |
| 2008/0302014 A1 | 12/2008 | Szczerba | |
| 2009/0122018 A1 | 5/2009 | Vymenets | |
| 2009/0143937 A1 | 6/2009 | Craig | |
| 2009/0144622 A1 | 6/2009 | Evans et al. | |
| 2009/0184480 A1 | 7/2009 | Larsson et al. | |
| 2009/0210110 A1 | 8/2009 | Dybalski et al. | |
| 2009/0313567 A1 | 12/2009 | Kwon | |
| 2010/0176632 A1 | 7/2010 | Alford et al. | |
| 2010/0248788 A1 | 9/2010 | Yook | |
| 2010/0313164 A1 | 12/2010 | Louch et al. | |
| 2010/0318266 A1 | 12/2010 | Schaaf et al. | |
| 2011/0037725 A1 | 2/2011 | Pryor | |
| 2011/0082627 A1 | 4/2011 | Small | |
| 2011/0087982 A1 | 4/2011 | McCann | |
| 2011/0087989 A1 | 4/2011 | McCann | |
| 2011/0099512 A1 | 4/2011 | Jeong | |
| 2011/0138295 A1 | 6/2011 | Momchilov et al. | |
| 2011/0138314 A1 | 6/2011 | Mir | |
| 2011/0148626 A1 | 6/2011 | Acevedo | |
| 2011/0166748 A1 | 7/2011 | Schneider | |
| 2011/0282537 A1 | 11/2011 | Yamasaki | |
| 2012/0005602 A1 | 1/2012 | Anttila | |
| 2012/0081310 A1 | 4/2012 | Schrock | |
| 2012/0084692 A1 | 4/2012 | Donghee | |
| 2012/0110497 A1 | 5/2012 | Gimpl | |
| 2012/0131496 A1 | 5/2012 | Goossens et al. | |
| 2012/0311498 A1 | 12/2012 | Kluttz | |
| 2013/0099523 A1 | 4/2013 | Brown et al. | |
| 2013/0132485 A1 | 5/2013 | Thomas | |
| 2013/0179304 A1 | 7/2013 | Swist | |
| 2013/0208190 A1 | 8/2013 | Slothouber et al. | |
| 2013/0305155 A1 | 11/2013 | Yoon | |
| 2014/0093107 A1 | 4/2014 | Vu et al. | |
| 2014/0095023 A1 | 4/2014 | Myggen | |
| 2014/0095029 A1 | 4/2014 | Myggen | |
| 2014/0095030 A1 | 4/2014 | Myggen | |
| 2014/0095031 A1 | 4/2014 | Boblett et al. | |
| 2014/0095997 A1 | 4/2014 | Vu et al. | |
| 2014/0096003 A1 | 4/2014 | Vu et al. | |
| 2014/0096069 A1 | 4/2014 | Boblett et al. | |
| 2017/0277274 A1 | 9/2017 | Boblett et al. | |
| 2017/0302708 A1 | 10/2017 | Monroe et al. | |
| 2018/0095543 A1 | 4/2018 | Myggen | |

FOREIGN PATENT DOCUMENTS

| | | |
|---|---|---|
| JP | 05278469 B2 | 4/1998 |
| JP | 09261800 B2 | 9/2002 |
| KR | 1020120014444 | 2/2012 |
| WO | WO 06/135326 | 12/2006 |

OTHER PUBLICATIONS

International Application No. PCT/US2013/056138, International Search Report dated Jan. 24, 2014, 5 pages.
Windows7—Adjust the sound:http://windows.microsoft.com/en-us/windows7/adjust-the-sound-level-on-your-computerTutorial on using Microsoft Windows 7 Volume Control—Accessible as early as Aug. 10, 2009.
Windows7—Touch:http://windows. microsoft.com/en-us/windows7/products/features/touchTutorial on using Microsoft Windows 7 with a Touch Screen—Accessible as early as Jun. 27, 2009.

(56) References Cited

OTHER PUBLICATIONS

International Application No. PCT/US2013/056138, International Search Report dated Jan. 24, 2014, 15 pages.
International Search Report and Written Opinion; International Application No. PCT/US2016/053424; dated Jan. 17, 2017; 6 pgs.
International preliminary report on patentability in application PCT/US2013/055827, dated Apr. 9, 2015, 8 pages.
Extended European Search Report dated Aug. 24, 2016 in patent application No. 13841506.2.

* cited by examiner

VEHICULAR INTERFACE SYSTEM FOR LAUNCHING AN APPLICATION

CROSS REFERENCE TO RELATED APPLICATIONS

The present U.S. Utility Patent Application claims priority pursuant to 35 U.S.C. § 120 as a continuation of U.S. Utility application Ser. No. 13/765,363, entitled "METHOD OF LAUNCHING AN APPLICATION AND SELECTING THE APPLICATION TARGET WINDOW", filed Feb. 12, 2013, scheduled to issue as U.S. patent Ser. No. 10/019,066 on Jul. 10, 2018, which is a continuation of U.S. Utility application Ser. No. 13/764,942, entitled "METHOD OF LAUNCHING AN APPLICATION AND SELECTING THE APPLICATION TARGET WINDOW," filed Feb. 12, 2013, which claims priority pursuant to 35 U.S.C. § 119(e) to U.S. Provisional Application No. 61/706,915, entitled "VEHICLE USER INTERFACE," filed Sep. 28, 2012, all of which are hereby incorporated herein by reference in their entirety and made part of the present U.S. Utility Patent Application for all purposes.

FIELD OF THE INVENTION

The present invention relates generally to a user interface and, more particularly, to launching of an application on a user interface.

BACKGROUND

A conventional computer interface provides a variety of simplified techniques that can be used to select and activate a particular program or application. While the nomenclature and some of the launch features vary depending upon the operating system, in general these techniques allow a shortcut for the desired program/application to be placed directly on the desktop or within a taskbar or dock located at a screen edge, for example along the top or bottom of the screen. When the user selects a particular program/application, either by tapping (or double tapping) on the program/application icon if the interface is a touch-screen, or selecting the program/application by clicking (or double clicking) on the icon using a mouse, the program/application opens up on the screen. Generally, the program/application will open in a full screen mode, i.e., maximized to cover the entire screen window. In some operating systems, if the program/application was minimized prior to its last closure, when re-opened it will re-open in the same size window as when it was closed. Similarly, if the program/application was minimized prior to its last closure, when re-opened the program/application will typically be located in the same location on the screen as where it was when it was last closed.

When a touch-screen or mouse-controlled user interface is used in a vehicle, the driver is often required to open an application, input data, or otherwise interact with the interface in a rushed manner and while performing other tasks related to driving the car. In this and similar scenarios, conventional application shortcuts may provide the user with insufficient control. Accordingly, what is needed is shortcut technique that optimizes user control over the opening application, thus minimizing user interaction while still providing the user with the desired level of control. The present invention provides such a user interface.

SUMMARY

According to an embodiment of the present disclosure, a vehicular interface system provides application-based access to a plurality of vehicular subsystems of a vehicle via a graphical user interface (GUI). A taskbar is displayed in a first portion of the GUI, the taskbar including a plurality of icons, each of icons representing a corresponding application. A plurality of windows is displayed in a second portion of the GUI. When determining that a user-selected icon is being dragged from an initial location on the taskbar, a semi-transparent overlay corresponding to the application to be launched is displayed on a window of the GUI as the selected icon is being dragged within the window. When determining that the selected icon is released within a selected window, the corresponding application is launched in the selected window. In various embodiments, the application provides control options or monitoring information relating to subsystems of the vehicle.

DETAILED DESCRIPTION

The described embodiments utilize a large format screen, preferably a touch-screen, which is of sufficient size to allow multiple windows to be opened. It will be appreciated that the screen size required for multiple window viewing depends upon a number of factors, including the user. Thus while one embodiment utilizes a 17-inch touch-screen with a 16:10 aspect ratio, other embodiments may utilize both smaller and larger screen sizes.

In the illustrated embodiment, the touch-screen display is used in a vehicle, both as a visual aid and as a means of controlling multiple vehicle subsystems. It should be understood that the invention may also be used in non-vehicle applications (e.g., desktop computer, laptop computer, tablet, smartphone, etc.). If used within a vehicle compartment, preferably the display is mounted within the vehicle's central console, thus providing access to the data on the screen as well as the displayed system controls to both the driver and the passenger seated in the passenger front seat.

Figure 1:
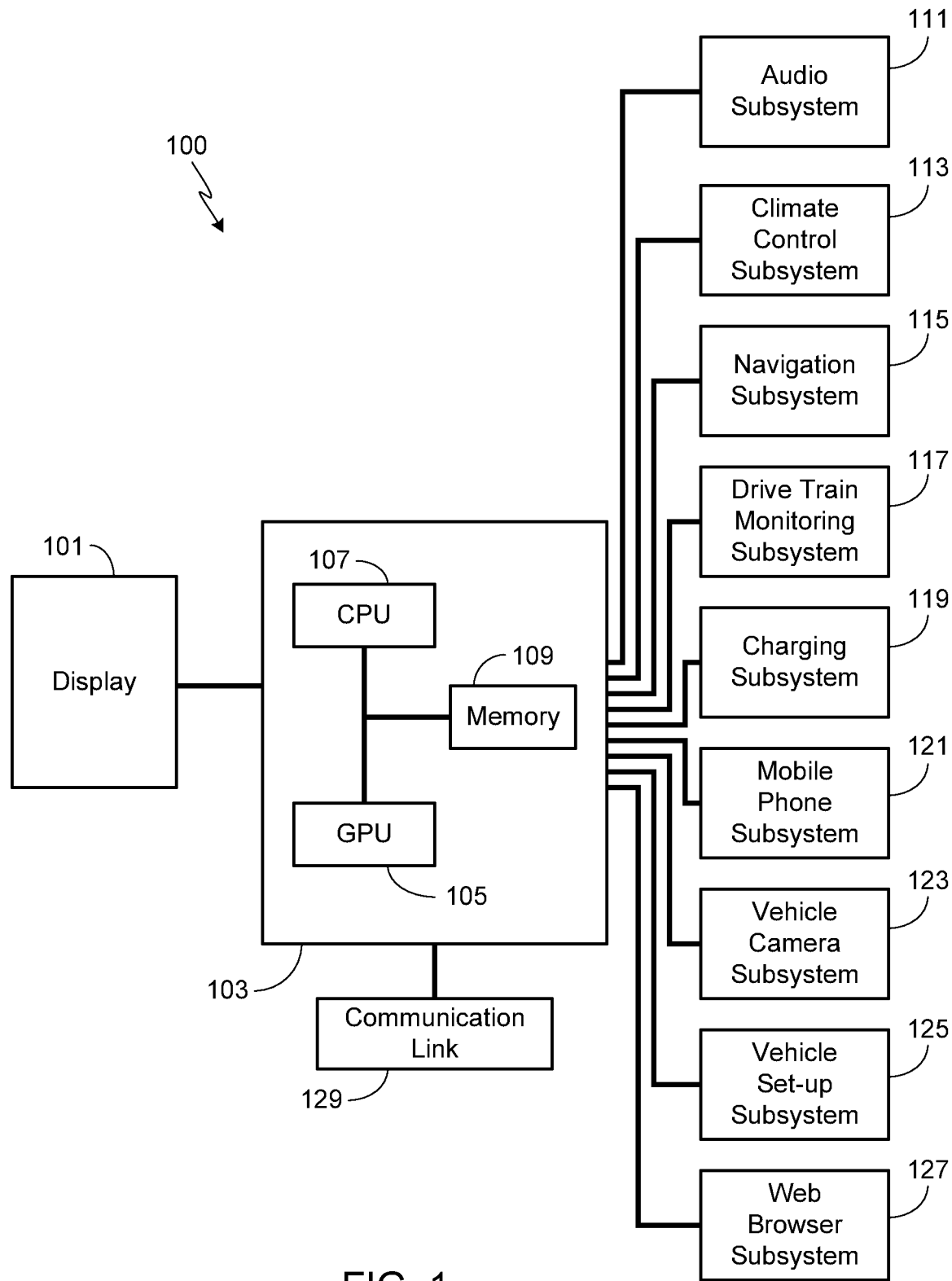
FIG. 1 provides a block diagram of an exemplary interface system that may be used with the present invention.

FIG. 1 provides a block diagram of an exemplary interface system 100 that includes touch-screen display 101 and is suitable for use with the invention. In system 100, display 101 is coupled to a system controller 103. Controller 103 includes a graphical processing unit (GPU) 105, a central processing unit (CPU) 107, and memory 109. CPU 107 and GPU 105 may be separate or contained on a single chip set. Memory 109 may be comprised of flash memory, a solid-state disk drive, a hard disk drive, or any other memory type or combination of memory types. Controller 103 is coupled to a variety of different vehicle subsystems, including the vehicle subsystem controls and vehicle subsystem monitors that are to be accessed and/or viewed on display 101. Exemplary subsystems include audio subsystem 111, climate control subsystem 113, navigation subsystem 115, drive train monitoring subsystem 117, charging subsystem 119, mobile phone subsystem 121, vehicle camera subsystem 123, vehicle set-up subsystem 125 and web browser subsystem 127. Vehicle set-up subsystem 125 allows general vehicle operating conditions to be set, conditions such as seat position, moon roof or sun roof position/operation, internal and external lighting, windshield wiper operation, etc. Preferably a mobile telecommunications link 129 is also coupled to controller 103, thereby allowing the controller to obtain updates, interface configuration profiles, and other data from an external data source (e.g., manufacturer, dealer, service center, web-based application, remote home-based system, etc.). Mobile telecommunications link 129 may be based on any of a variety of different standards including, but not limited to, GSM EDGE, UMTS, CDMA2000, DECT, and WiMAX.

Figure 2:
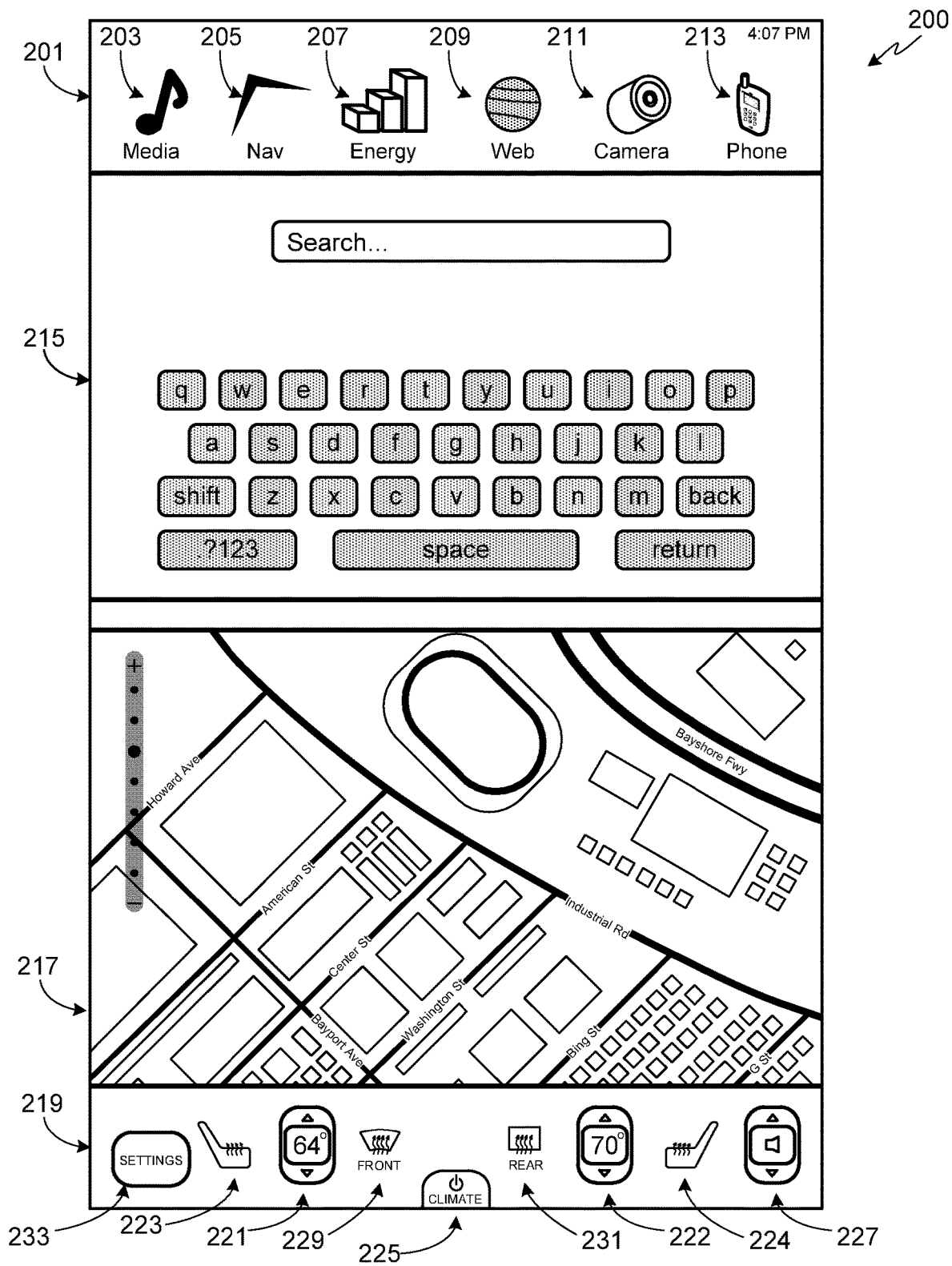
FIG. 2 illustrates an exemplary GUI screen.

FIG. 2 provides an exemplary screen 200. It should be understood that the icons and information shown on this and subsequent graphical user interface (GUI) screens is for illustration purposes only and that the invention is equally applicable to screens utilizing a different format, size or configuration as well as interfaces utilizing different operating systems, different programs/applications, etc. Furthermore, it should be understood that the terms "program", "application" and "program/application" are used interchangeably throughout this specification.

A GUI display configured for use with the invention, regardless of whether the display is a touch-screen or a non-touch-screen, includes a dedicated taskbar region 201. Although taskbar region 201 is shown positioned at the top of GUI screen 200, it will be appreciated that it could be located elsewhere (e.g., at the bottom of the screen, along a side of the screen, etc.). Within taskbar 201 are icons representative of the applications that provide the user with shortcut access to each of the designated applications, for example applications that control various vehicle subsystems. In one embodiment the application shortcuts located within the taskbar are configured by a third party (e.g., the system or vehicle manufacturer) while in another embodiment the application shortcuts located within the taskbar are configured by the end user. Typically, the shortcuts in taskbar 201 represent those applications for which frequent access is desired. In the exemplary GUI screen the illustrated shortcuts are for a media/audio/entertainment system application (i.e., media icon 203), a navigation system application (i.e., navigation icon 205), an energy tracking application that monitors battery usage/charging (i.e., energy icon 207), a browser application (i.e., web icon 209), a camera application for a back-up and/or forward view camera (i.e., camera icon 211), and a mobile/cell phone interface application (i.e., phone icon 213).

In accordance with the invention, a portion of the GUI display screen is divided into two or more windows that are used to display the selected applications. In the exemplary screen 200, two windows are shown with upper window 215 displaying web browser application 209 and lower window 217 displaying a map selected via navigation interface application 205. In this embodiment, a selected window may be expanded to cover all of the windows, a particularly useful feature when either the web browser or the navigation system is selected. Additionally, in some embodiments the user can resize windows, for example allowing the lower window to cover 75% of the available display screen while the upper window covers only 25% of the available display screen.

In the illustrated GUI a portion 219 of the screen is used for persistent controls that remain on the display screen regardless of the applications being displayed on the screen. These persistent controls may be selected based on the need for frequent access (e.g., temperature controllers 221/222, seat warmers 223/224, climate controller 225 and audio volume controller 227, etc.) or for safety (e.g., front defroster controller 229, rear defroster controller 231, etc.). In the exemplary screen, a "settings" button 233 is also shown, which provides the user with instant access to the various vehicle settings (e.g., lights, sunroof control, etc.). The persistent controls may be configured by the user, the system/vehicle manufacturer, or by a third party.

Figure 3:
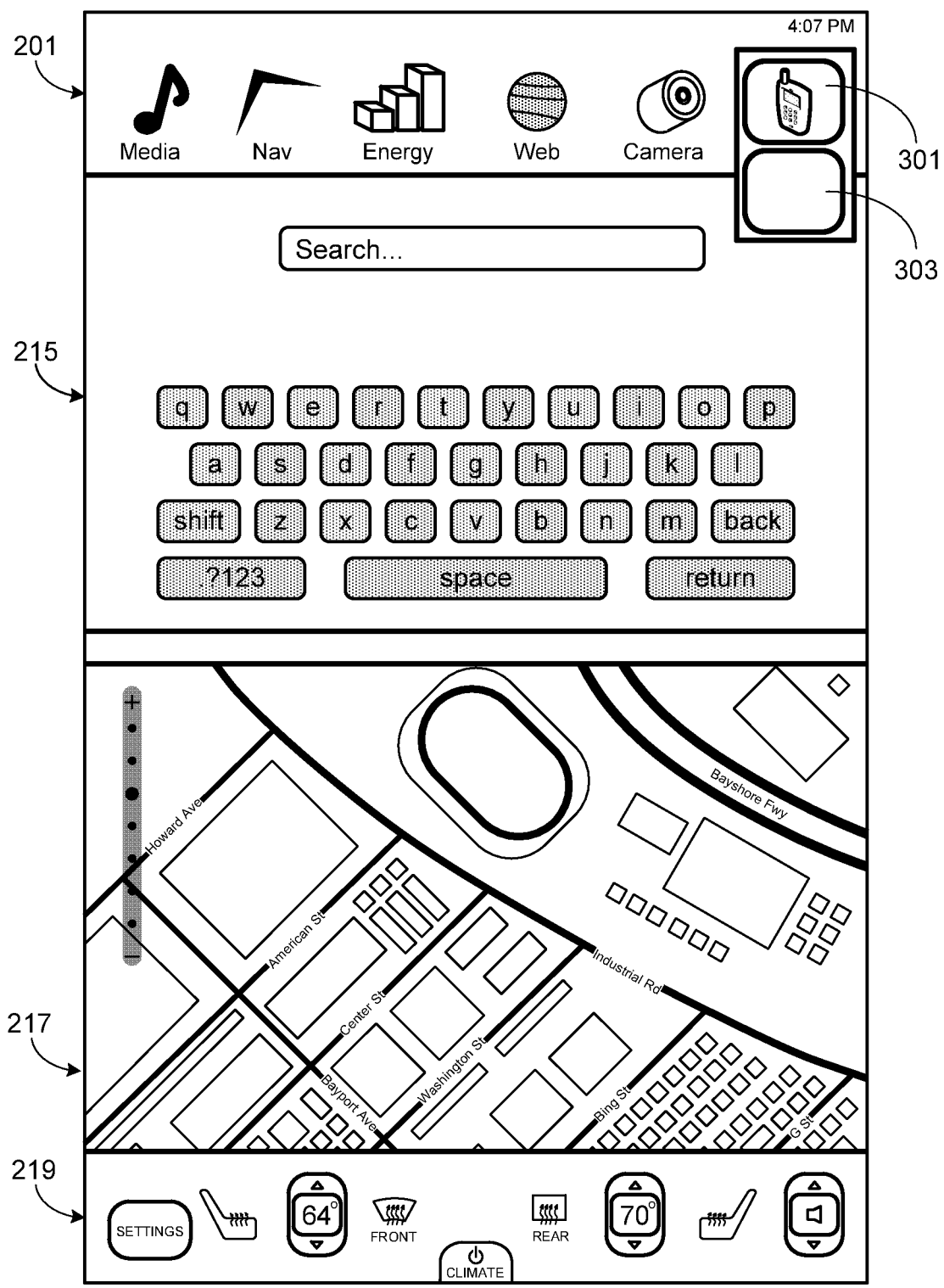
FIG. 3 illustrates an exemplary GUI screen based on the GUI screen shown in FIG. 2 after an application has been selected.
Figure 4:
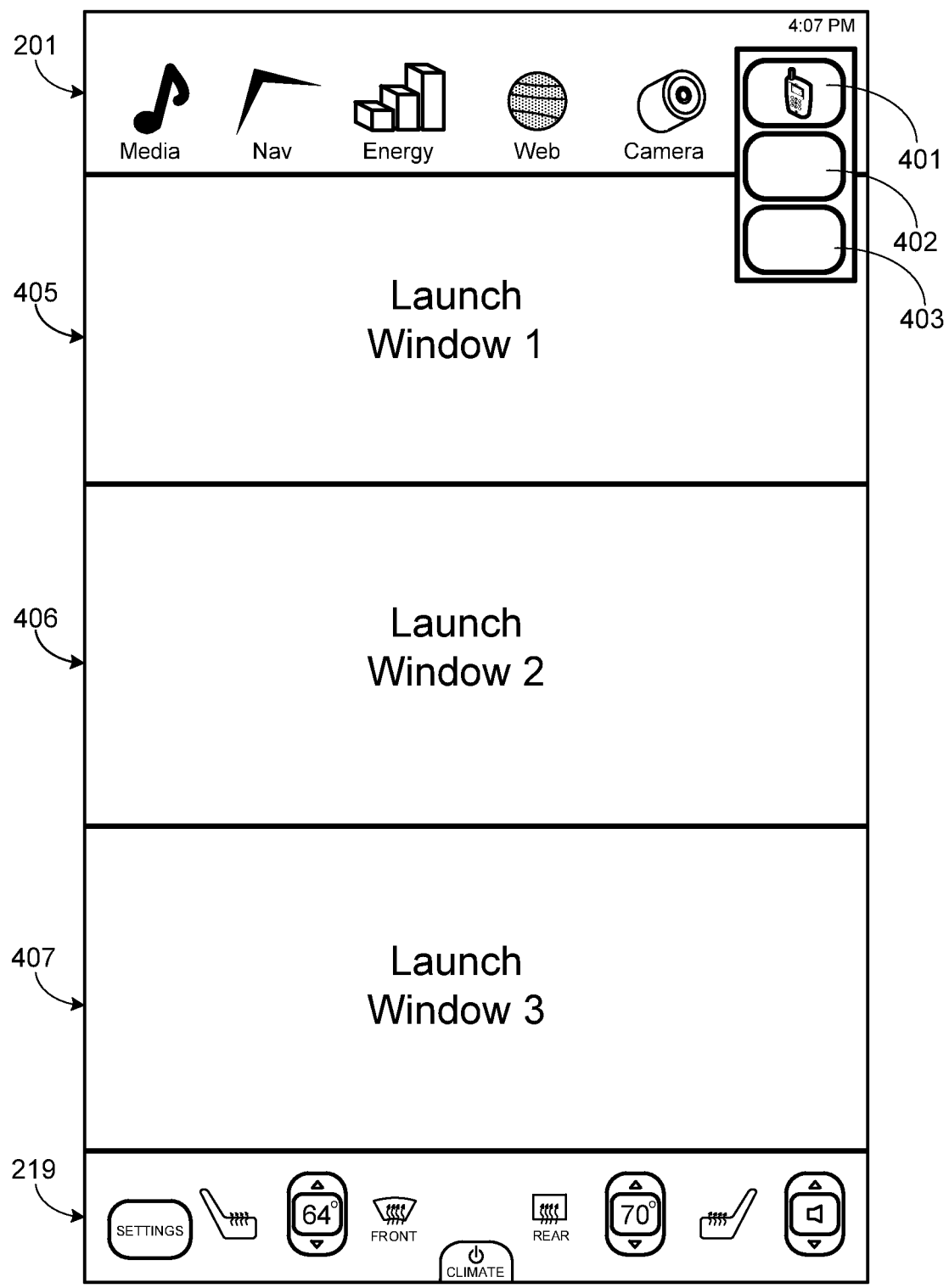
FIG. 4 illustrates an exemplary GUI screen with three available launch windows after an application has been selected.
Figure 5:
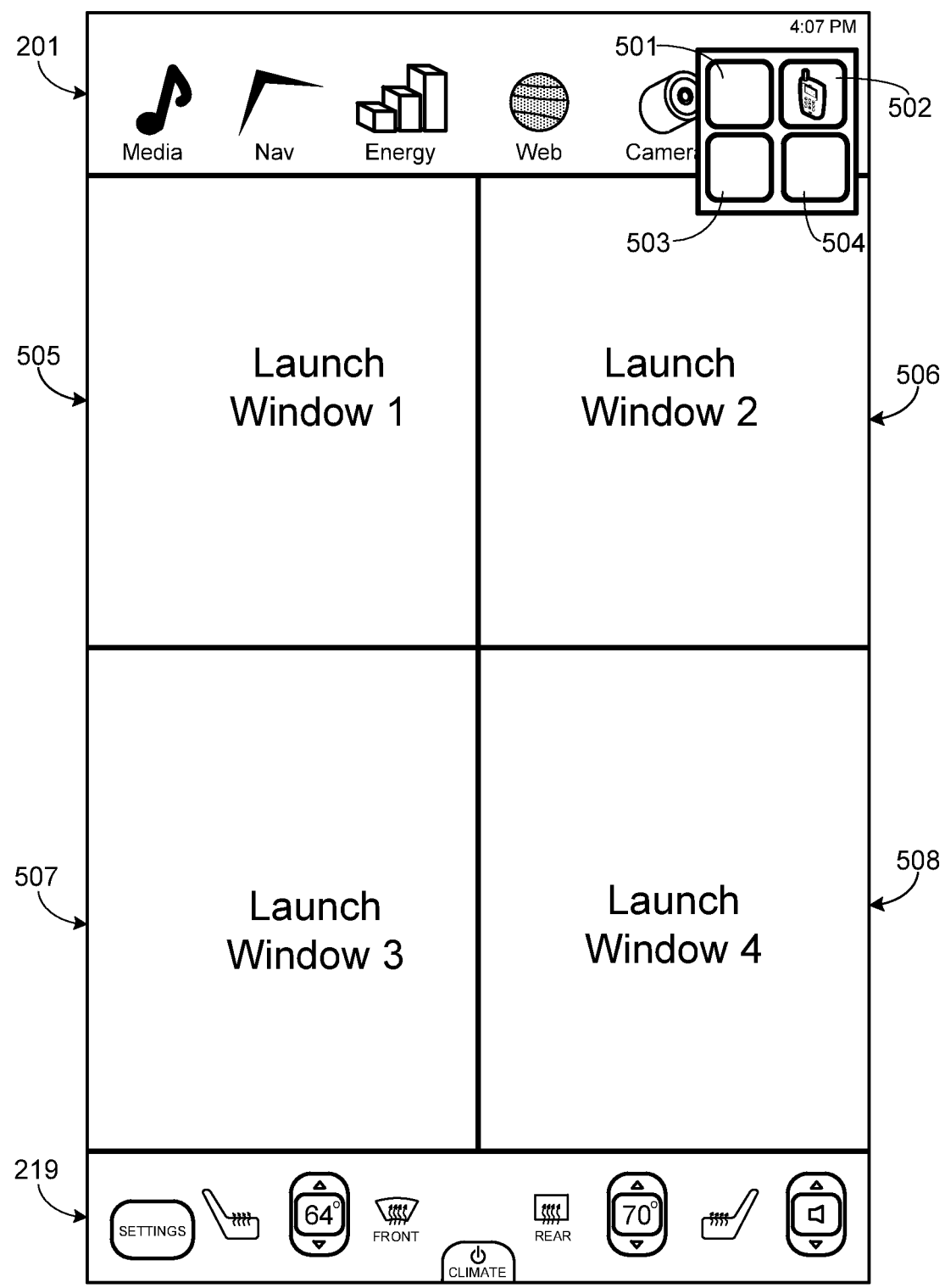
FIG. 5 illustrates an exemplary GUI screen with four available launch windows after an application has been selected.

In accordance with the invention, when a user selects an application within taskbar 201, either by touching the selected application if the GUI is a touch-screen or by selecting the application with a mouse if the GUI is not a touch-screen (or if the user prefers the use of a mouse rather than the touch-screen interface), the user is presented with a visual cue that represents the possible windows in which the application may be launched. For example, FIG. 3 illustrates the same GUI screen as shown in FIG. 2 after the user has first tapped (or otherwise selected) phone application 213. As shown, a miniature representation of the two available launch windows is graphically shown on the screen, where miniature window 301 represents upper window 215 and miniature window 303 represents lower window 217. It will be appreciated that other visual cues may be used to represent the available launch windows. Note that the visual cue shows all possible launch windows thus, for example, FIG. 4 illustrates a similar exemplary GUI with three possible launch windows 401-403 representing zones 405-407, respectively, while FIG. 5 illustrates a similar exemplary GUI with four possible launch windows 501-504 representing zones 505-508, respectively.

Figure 6:
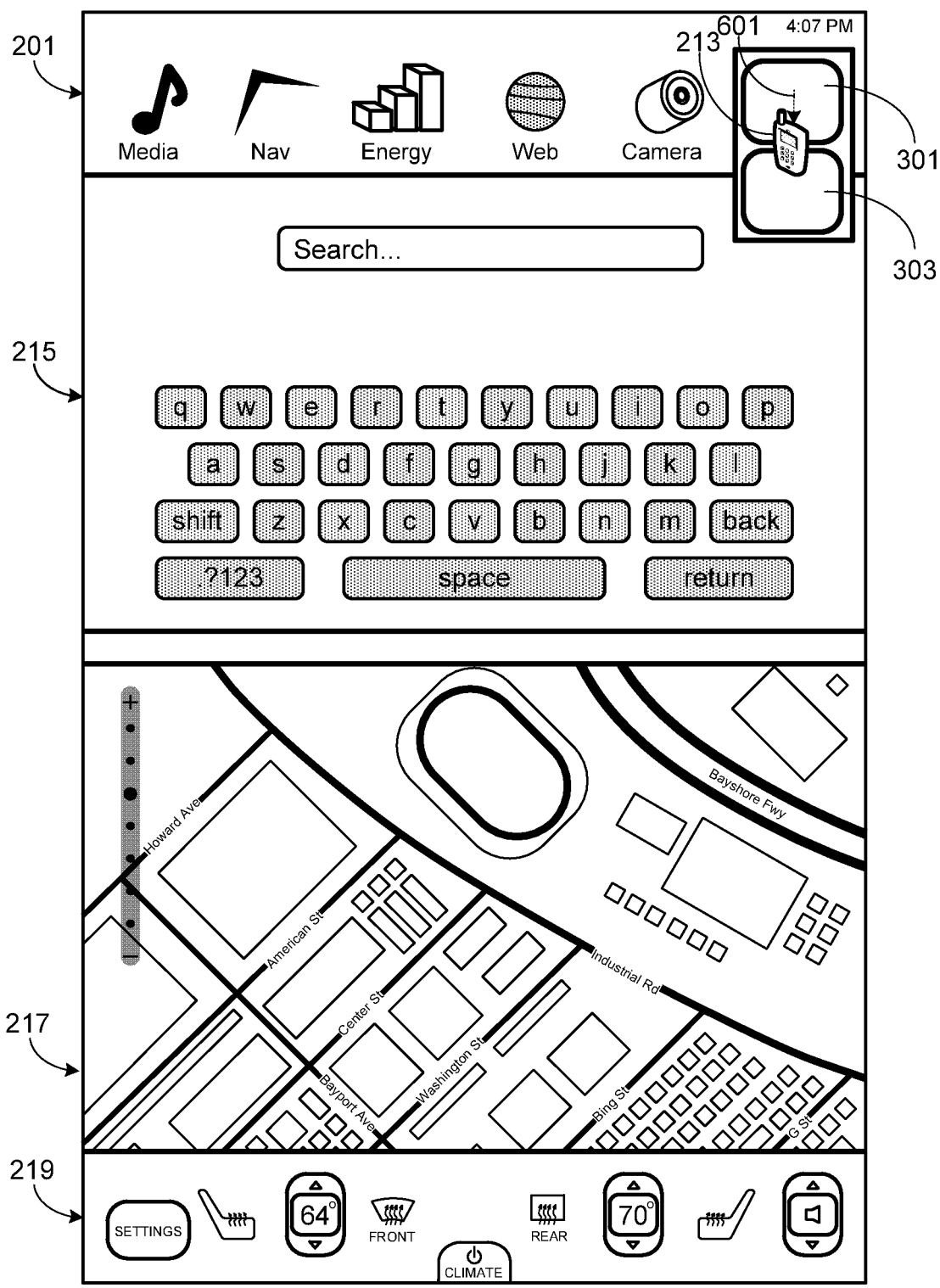
FIG. 6 illustrates the same view of the GUI screen as provided in FIG. 3 except for the motion of the phone application icon.
Figure 7:
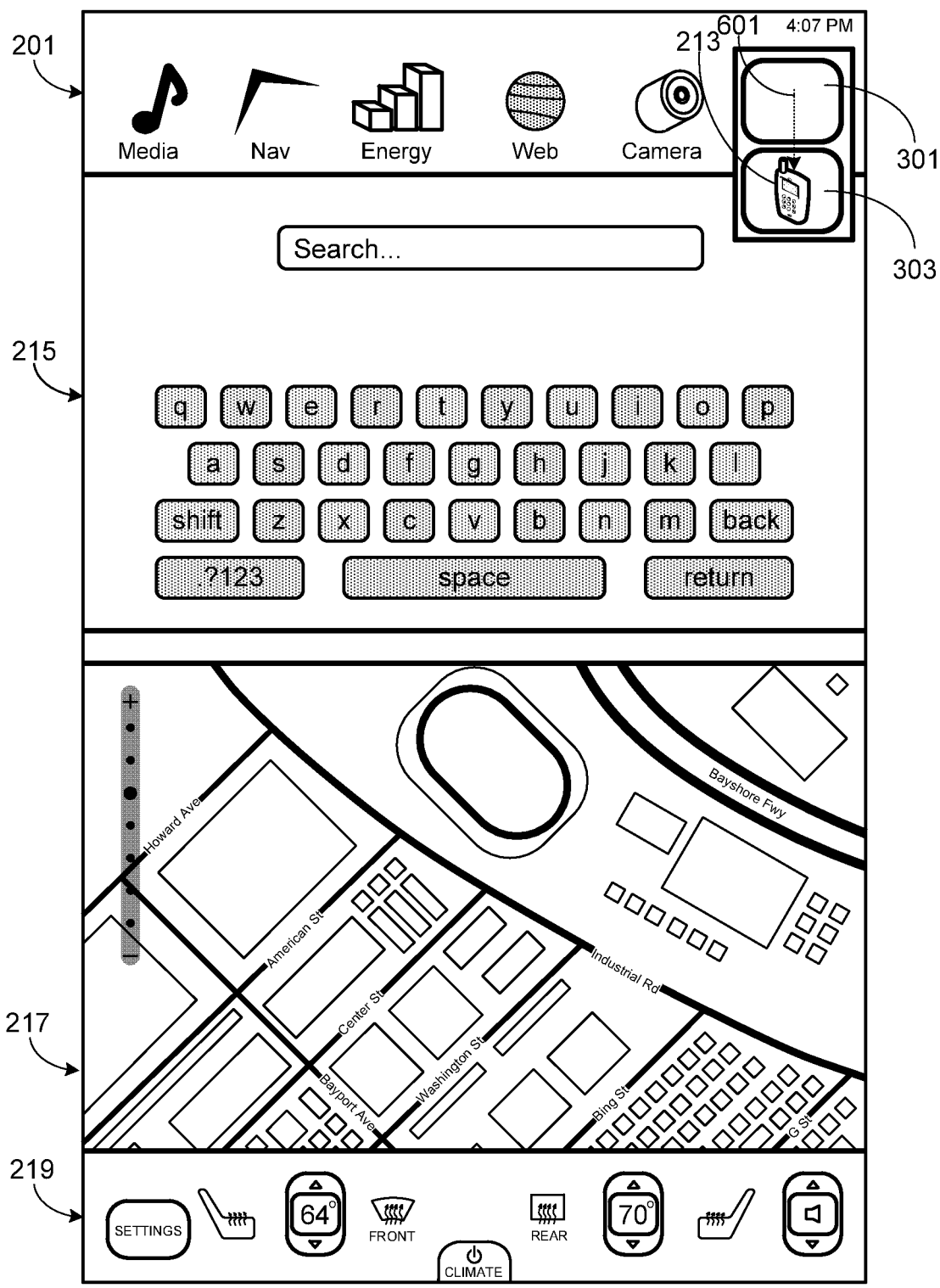
FIG. 7 illustrates the same view of the GUI screen as provided in FIG. 6 except for the continued motion of the phone application icon to the lower miniature window in the visual cue.

In FIG. 3 application 213 has just been selected and the user has not moved the phone icon. Therefore, at this point in time the user is still touching icon 213 or otherwise still selecting icon 213, for example by holding a mouse cursor on icon 213 and still depressing the left mouse button (i.e., click-and-hold). Next, the user selects the window in which to launch the selected application. In order to select the launch window the user, while still selecting the icon, moves the icon to the desired window in the visual representation (i.e., the visual cue described above). For example, assuming a touch-screen display as well as a two-window configuration as described above and illustrated in FIGS. 2 and 3, the user touches the icon of the application to be launched (e.g., phone icon 213) and then, while still holding the icon, slides the icon to the miniature window in the visual cue that represents the display window in which the application is to be launched. FIGS. 6 and 7 illustrate icon 213 being slid from its initial location to lower miniature window 303, thus causing the corresponding application, i.e., phone application, to be launched in the lower window 217. Dashed line 601 illustrates the dragging motion of icon 213 during this process (note that line 601 is not actually shown on the display but is meant only to illustrate the dragging motion of the icon in these figures).

Figure 8:
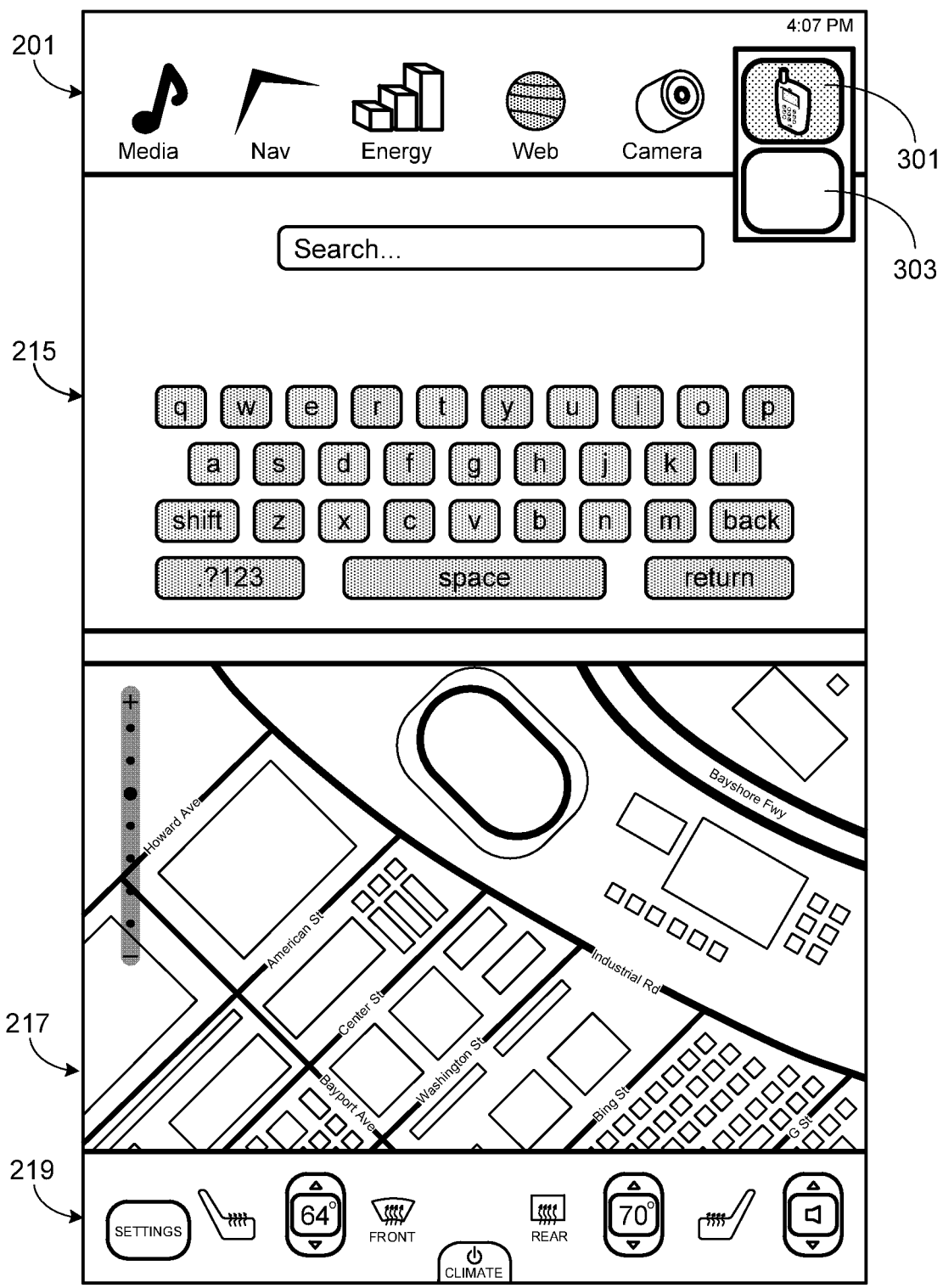
FIG. 8 illustrates the same view of the GUI screen as provided in FIG. 3 except that the mini-window corresponding to the currently destination window is highlighted.
Figure 9:
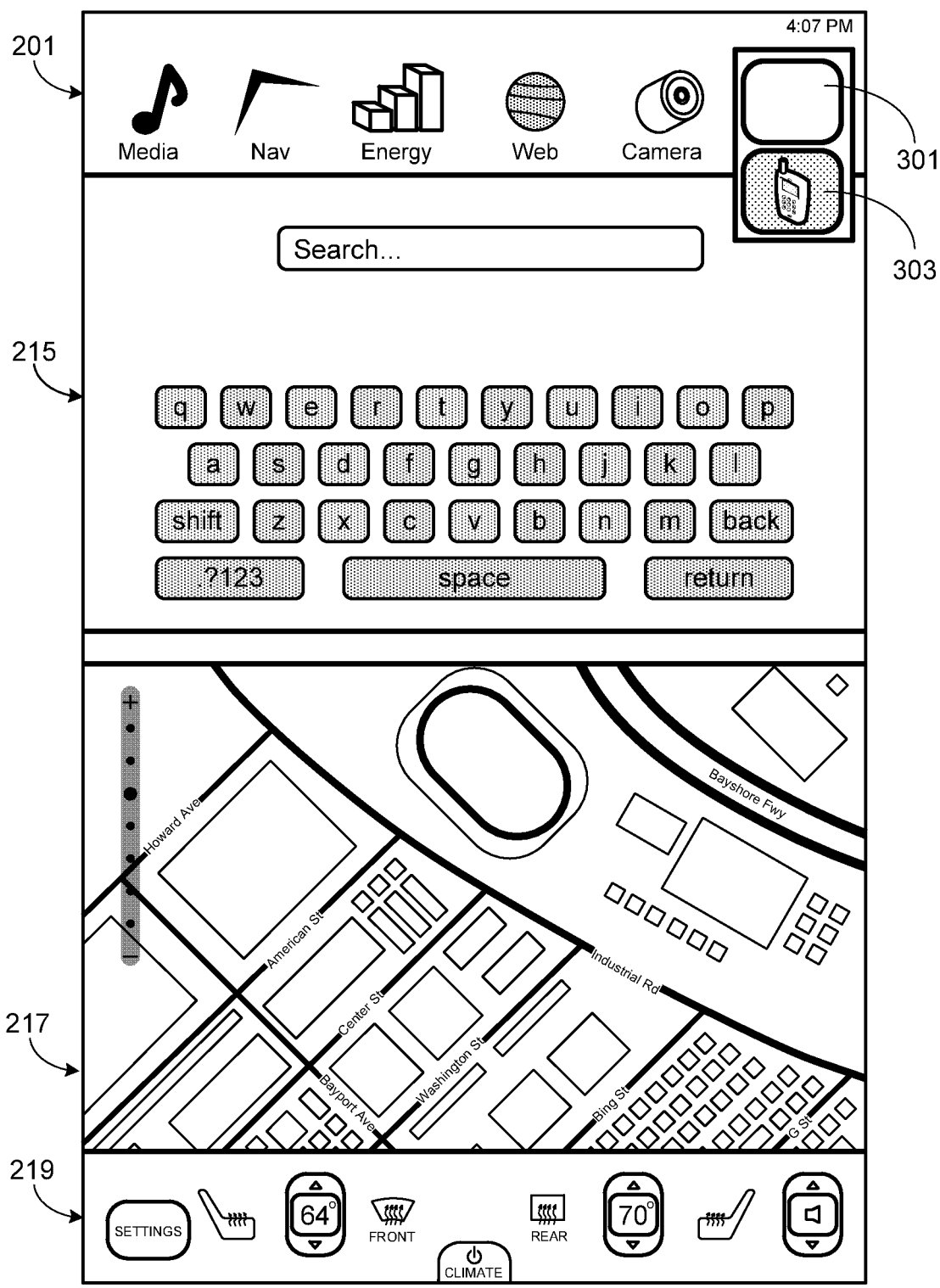
FIG. 9 illustrates the same view of the GUI screen as provided in FIG. 8 except that the application icon has been dragged from the upper to the lower visual cue window, thereby causing the highlighted mini-window to change from the upper mini-window to the lower mini-window.

In an embodiment, the miniature window (e.g., mini-windows 301 and 303) of the visual cue in which the icon is currently located is highlighted, for example by shading the background, thus indicating in which window the selected application will launch. This form of highlighting, illustrated in FIGS. 8 and 9, aid the user in visualizing the launch window.

Figure 10:
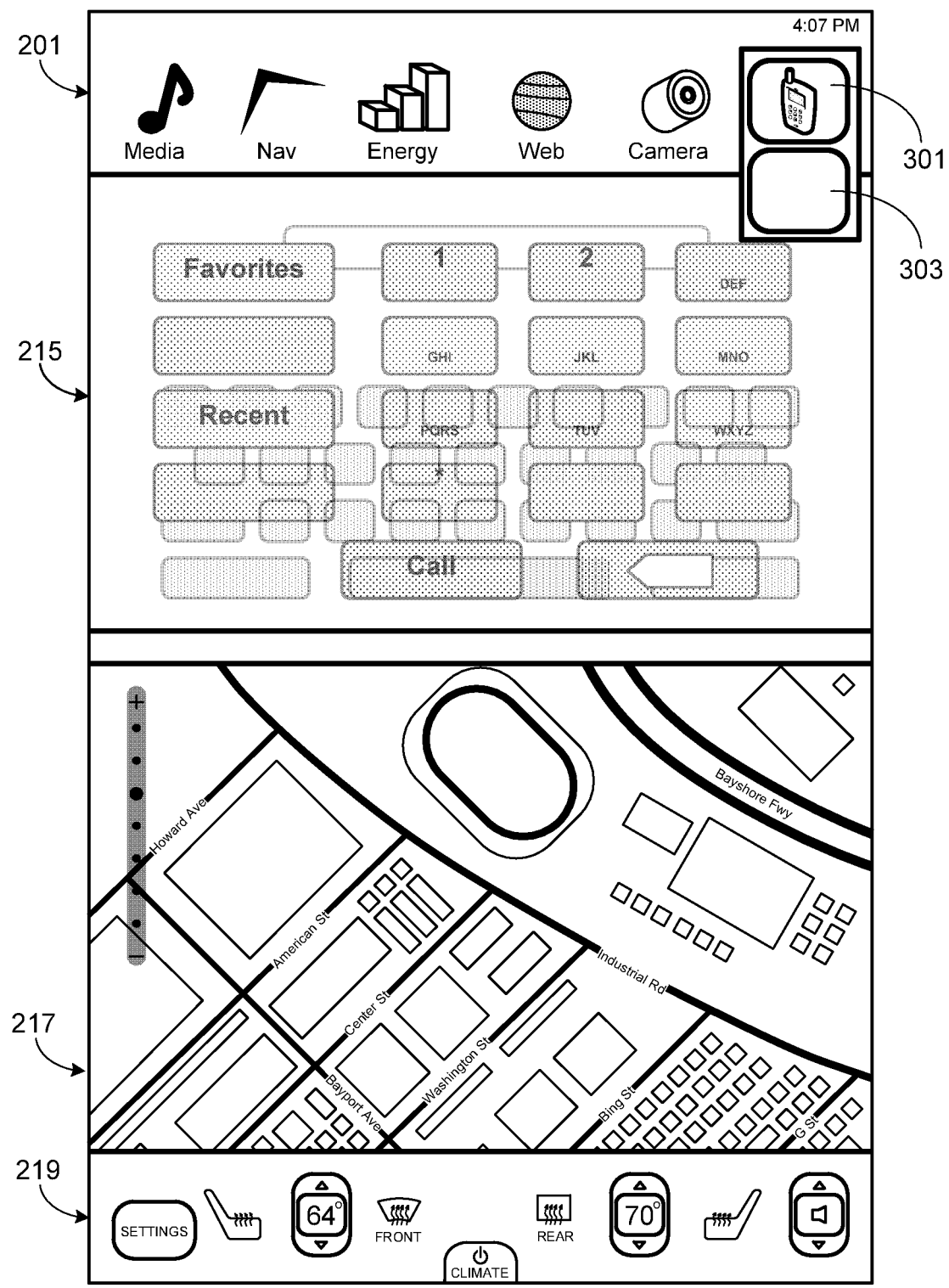
FIG. 10 illustrates the same view of the GUI screen as provided in FIG. 3 except that the selected application is displayed in a semi-transparent state as an overlay on the currently selected visual cue window.
Figure 11:
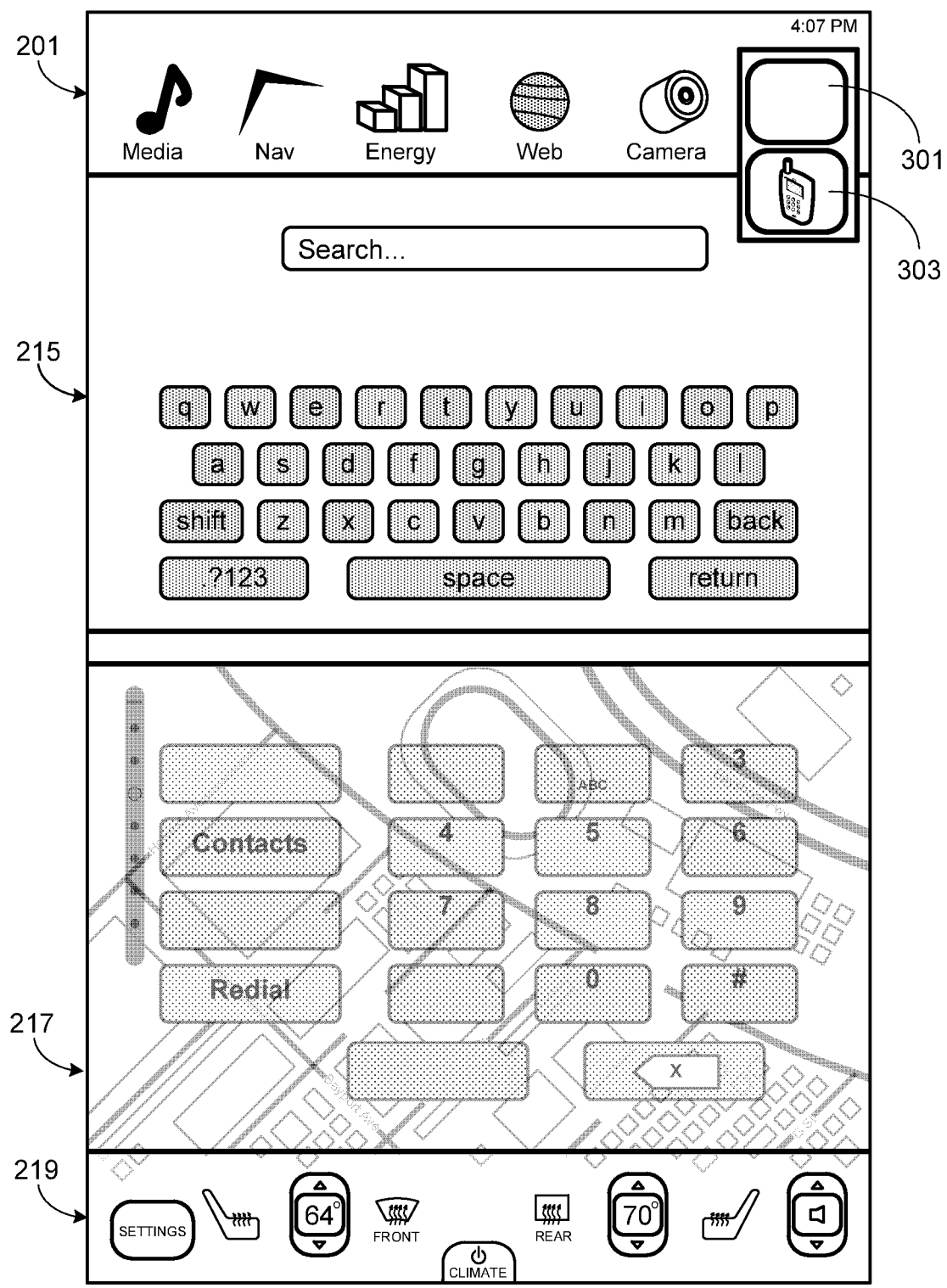
FIG. 11 illustrates the same view of the GUI screen as provided in FIG. 10 except that the application has been dragged from the upper to the lower visual cue window, thereby causing the selected application to be displayed in a semi-transparent state as an overlay on the lower window.

In another technique of indicating the launch window, which can be used alone or in conjunction with the mini-window highlighting technique, as the user drags the icon of the application to be launched over the miniature windows of the visual cue (i.e., mini-windows 301 and 303), the application will appear in a semi-transparent state as an overlay on the corresponding window (i.e., windows 215 and 217). Therefore, when icon 213 is first selected and the user has not moved the icon out of upper visual cue window 301, the phone application will be visible over the browser application as illustrated in FIG. 10. If the user, prior to lifting a finger off of the screen (or unclicking the mouse button), moves icon 213 to lower visual cue window 303, then the phone application will be visible over the current lower window application (e.g., the navigation application in this example) as illustrated in FIG. 11.

Figure 12:
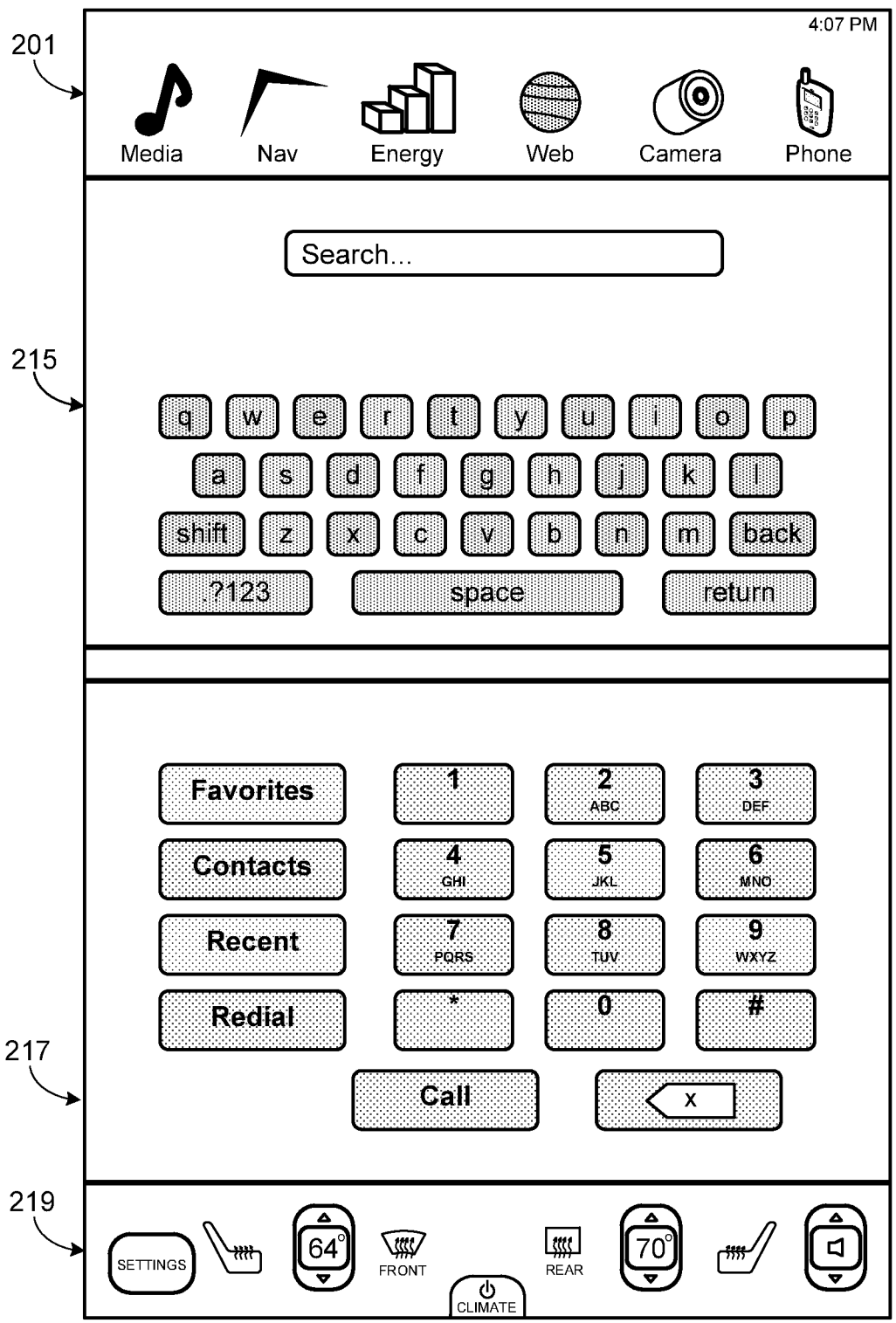
FIG. 12 illustrates the same view of the GUI screen as provided in FIG. 11 after the user has removed a finger from the touch-screen, or otherwise released the application, while the application icon is in the lower visual cue window.
Figure 13:
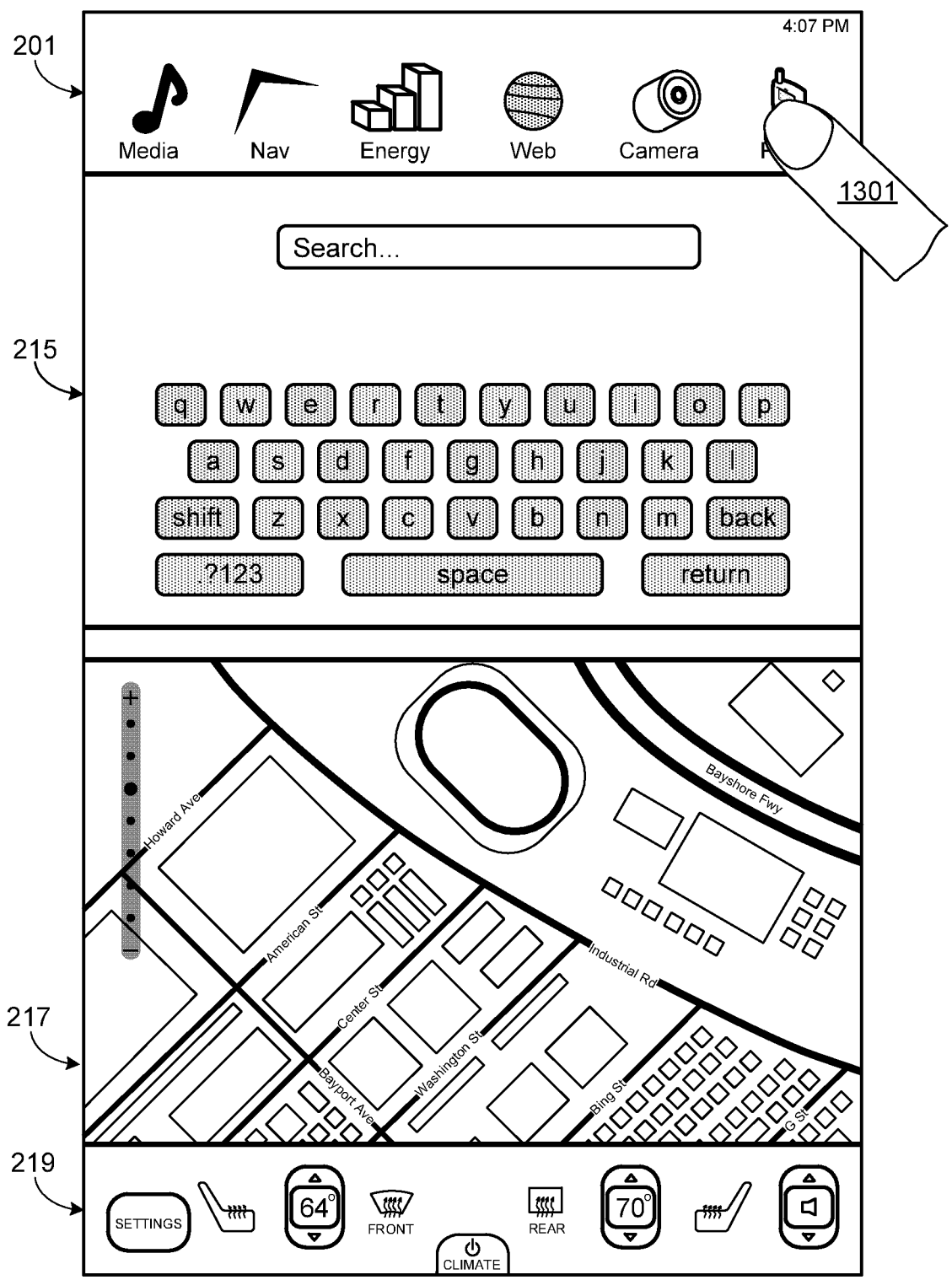
FIG. 13 illustrates the first step of an alternate embodiment in which the user selects an application icon from the taskbar and drags it to the window where it is to be opened.
Figure 14:
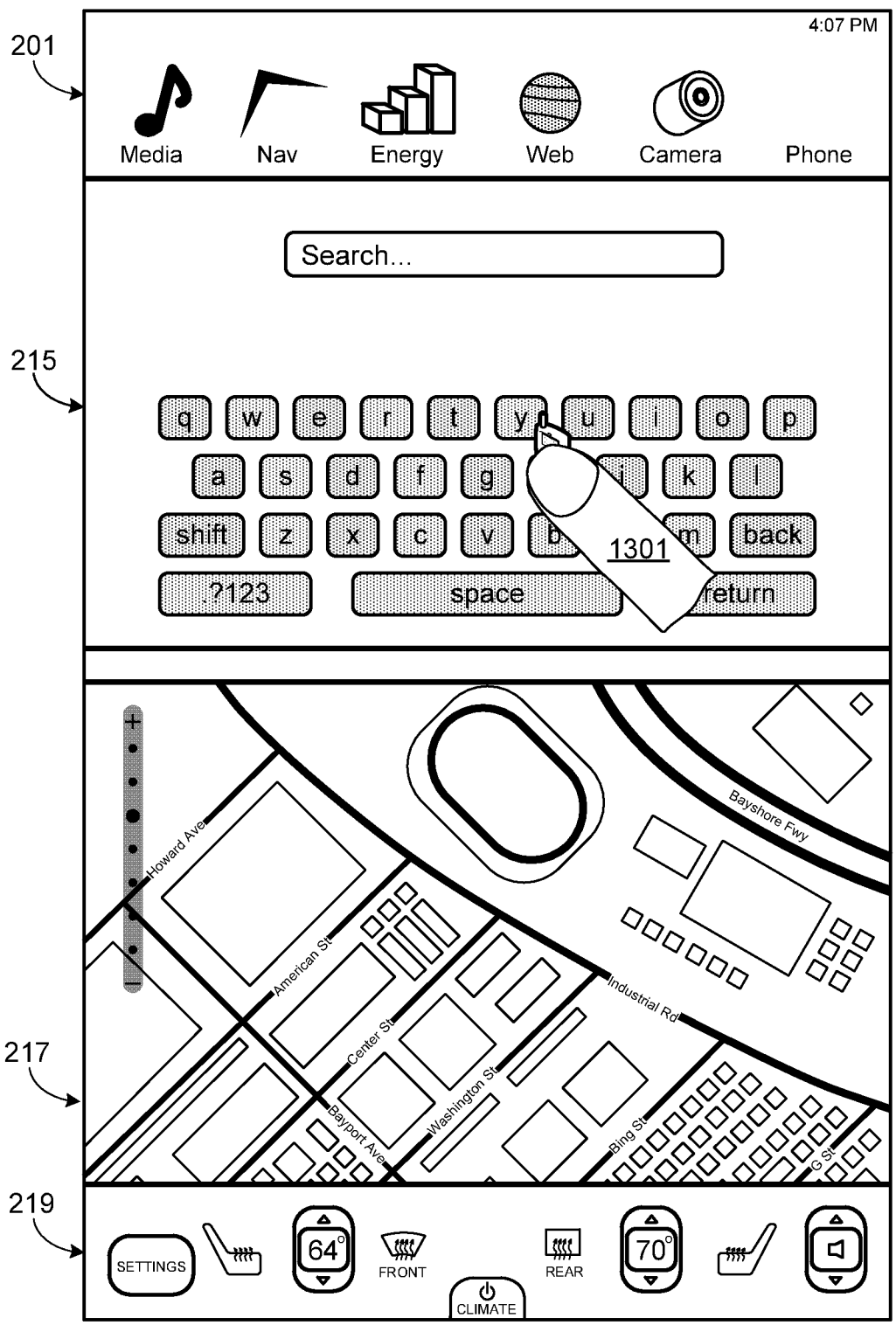
FIG. 14 illustrates a selected icon from the exemplary GUI screen shown in FIG. 2 in the process of being dragged to the destination window.
Figure 15:
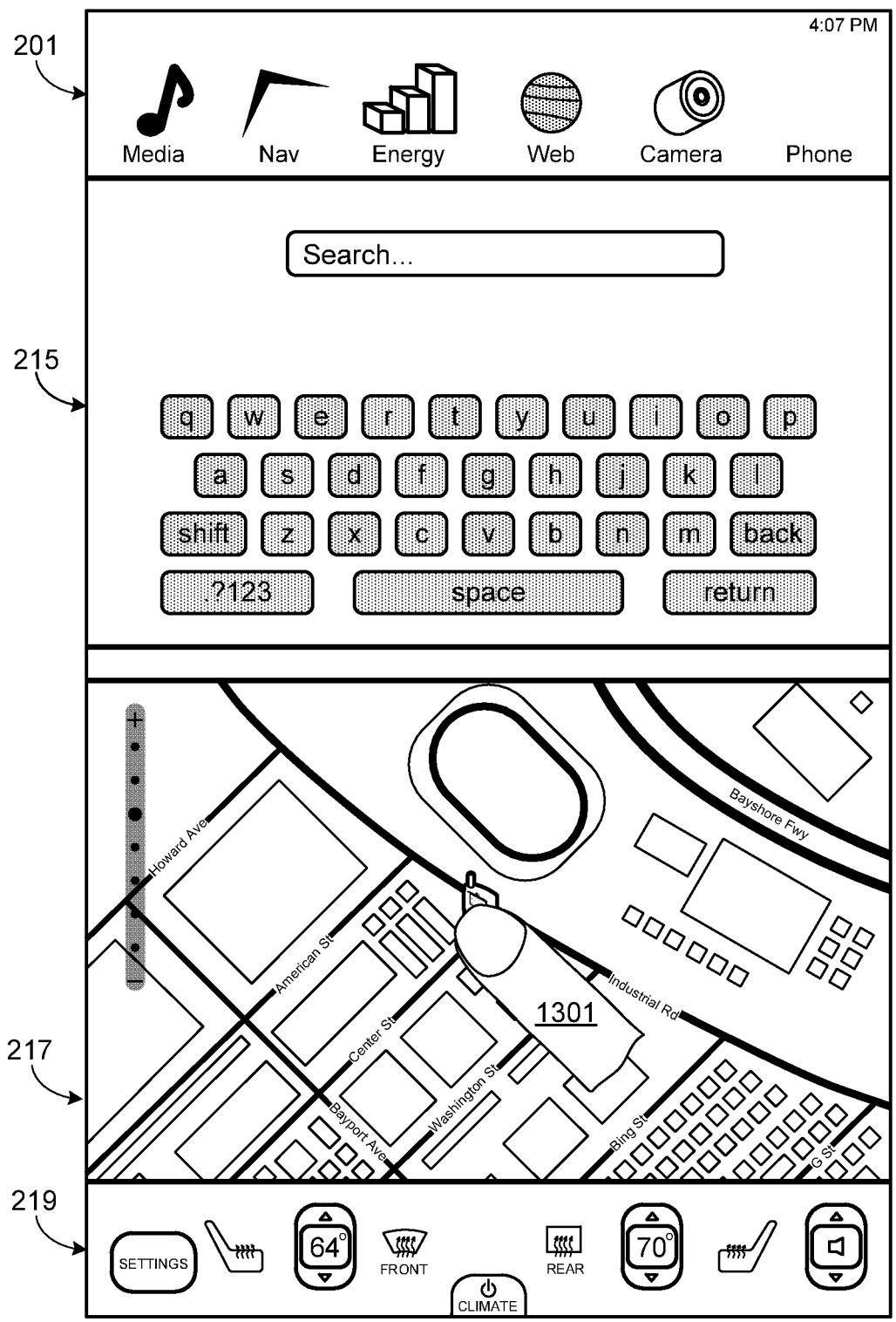
FIG. 15 illustrates the selected icon in the destination window.

After the user decides on the desired window for launching the selected application, the user merely lifts the finger from the screen (or release the previously selected mouse button). At this point the selected application will completely materialize in the selected window, replacing the application previously displayed in that window. Thus, for example, if after moving icon 213 to lower visual cue window 303 as shown in FIG. 11, once the user lifts the finger from the touch-screen the phone application corresponding to selected icon 213 completely materializes in window 217 as illustrated in FIG. 12.

In an alternate embodiment, the user selects the window in which an application is to be launched by dragging the icon from the taskbar to the desired launch window and then releasing the icon. Preferably the dragging and release functions are performed by the user via touching, dragging and removing a finger from a touch-screen (although this technique is equally applicable to non-touch-screens (e.g., using a mouse to select, drag and release the application icon)). As in the prior embodiment, this technique requires that the GUI display screen be divided into two or more windows, each of which can be used to display a selected application (see, for example, screen 200 shown in FIG. 2 that includes an upper window 215 displaying web browser application 209 and a lower window 217 displaying a map selected via navigation interface application 205).

Figure 16:
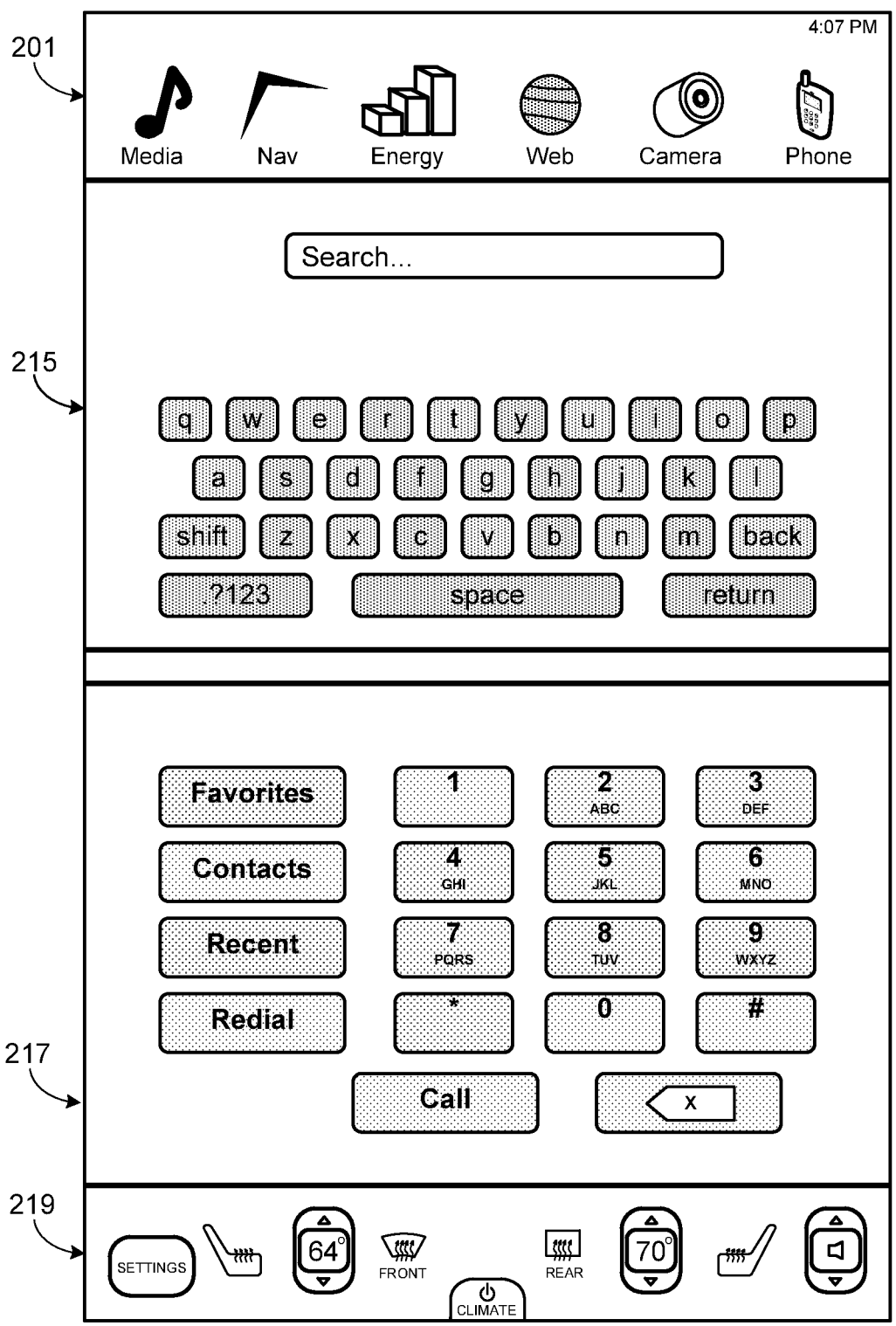
FIG. 16 illustrates the launch of the selected application once the user releases the selected icon.

FIGS. 13-16 illustrate a user's finger 1301 touching icon 213 (FIG. 13), dragging icon 213 downwards (FIG. 14) to lower window 217 (FIG. 15), and then releasing the icon FIG. 16. Upon release, the application associated with the selected icon, which in this example is the phone application, materializes in the selected window as shown in FIG. 16. As previously noted, in this embodiment a window is selected by placing the icon associated with the desired application, for example using a touch-and-slide motion on a touch-screen, anywhere within the window in which the application is desired.

Figure 17:
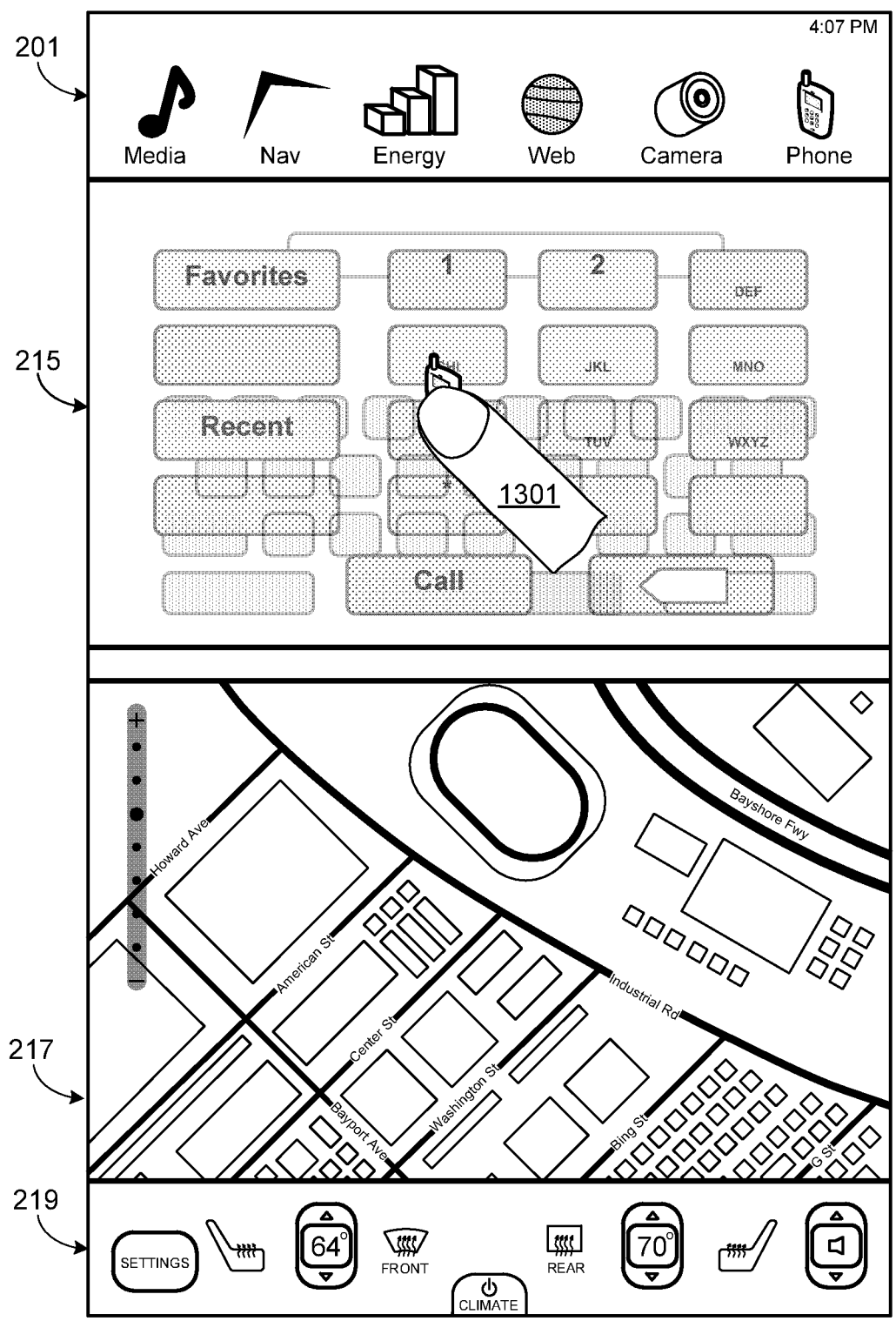
FIG. 17 illustrates a similar embodiment to that shown in FIG. 14, except that the selected application is displayed in a semi-transparent state as an overlay.
Figure 18:
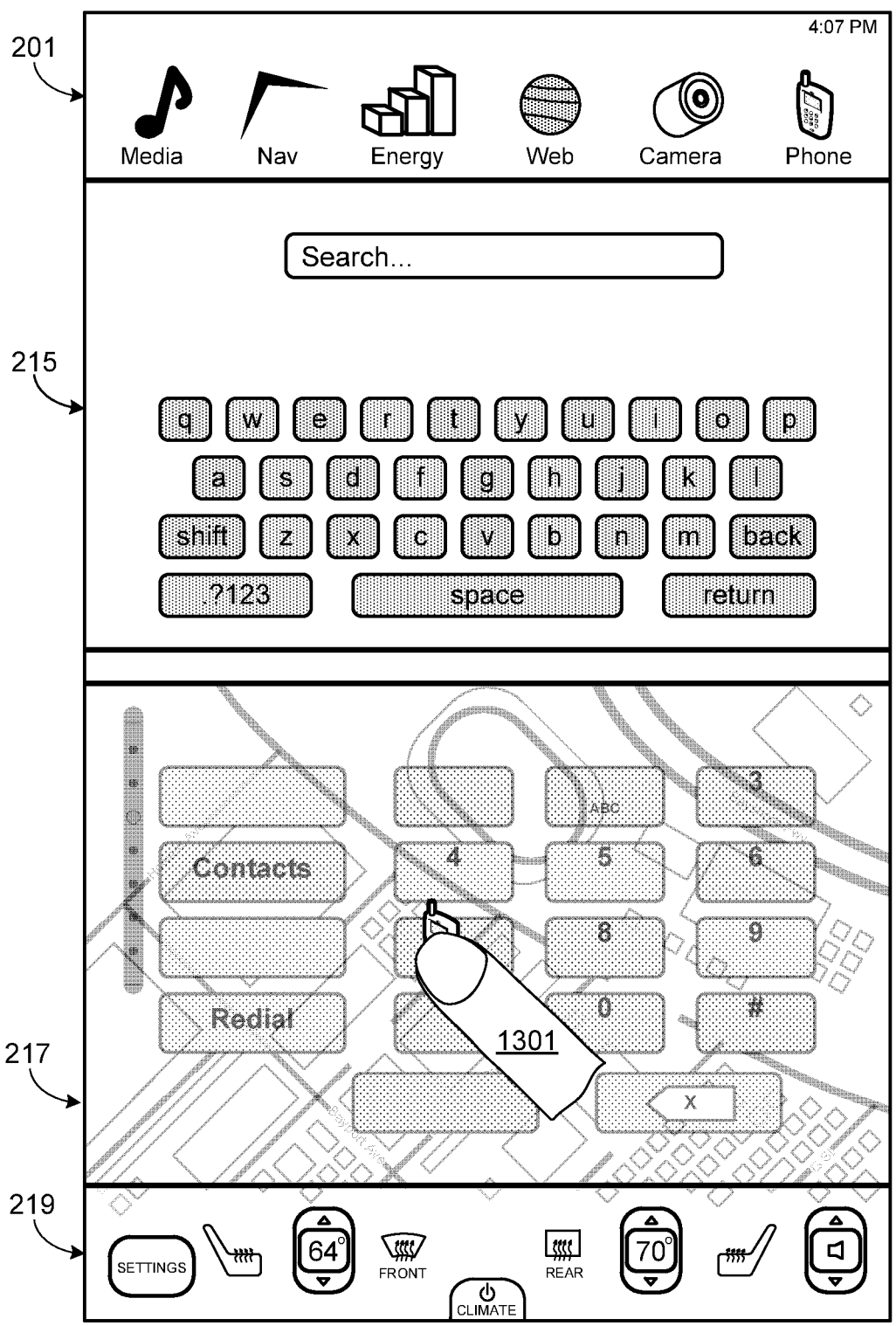
FIG. 18 illustrates a similar embodiment to that shown in FIG. 15, except that the selected application is displayed in a semi-transparent state as an overlay.

Preferably in this embodiment as the user drags the selected icon across the GUI display screen, the application associated with the selected icon partially materializes in whichever window the selected icon is currently within. Therefore, as the user is dragging icon 213 across upper window 215 and then lower window 217, instead of the screens shown in FIGS. 14 and 15 the screens would include a semi-transparent view of the phone application overlaying the current application as illustrated in FIGS. 17 and 18.

Figure 19:
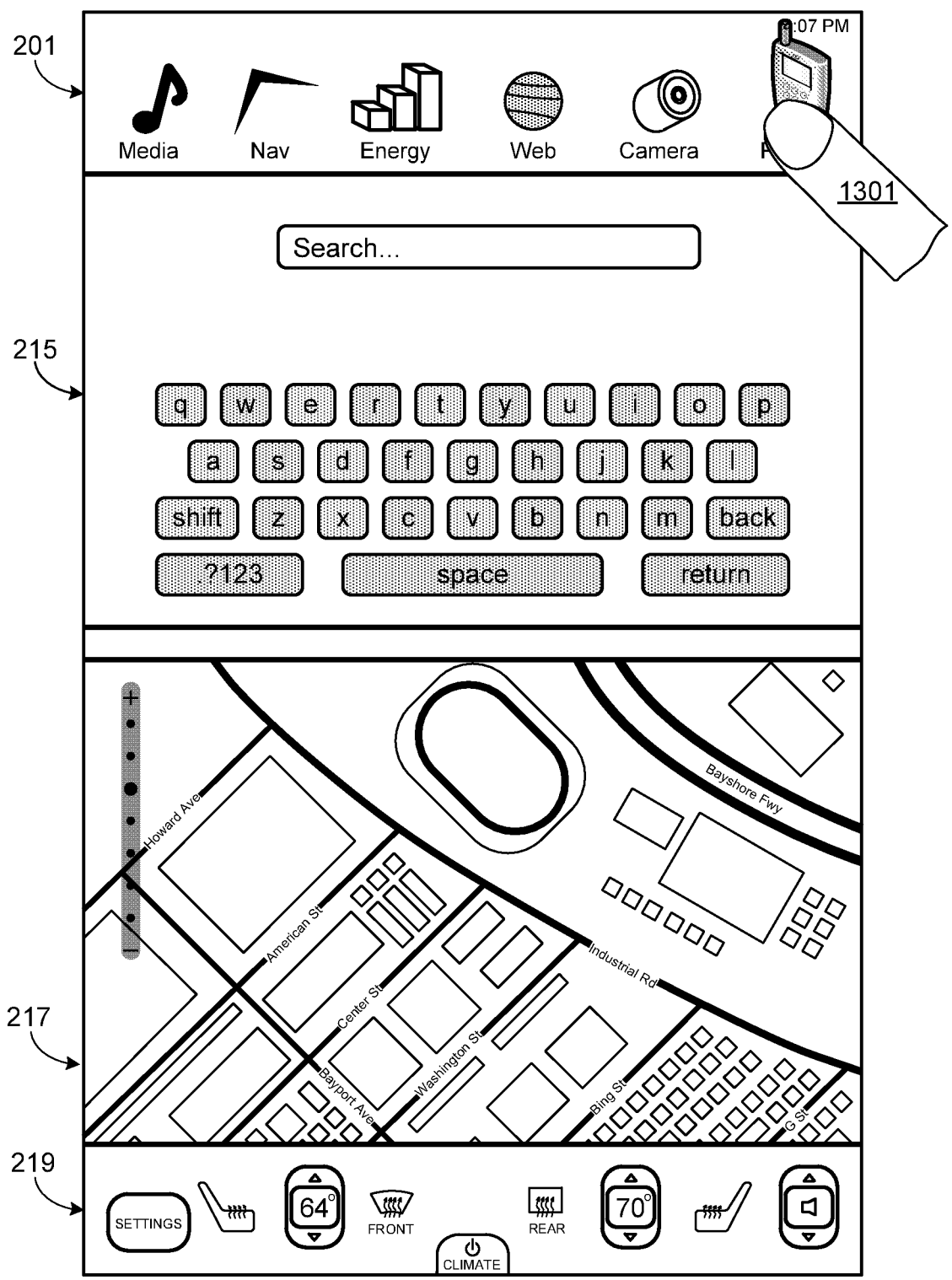
FIG. 19 illustrates a similar embodiment to that shown in FIG. 13, except that when the user selects an icon, the icon changes appearance.

Preferably in any of the previously described embodiments, when a user selects an icon, the icon changes in some small way, thus indicating to the user that the icon has been selected. For example, the icon can change size or color, thereby highlighting to the user that the icon has been selected. This feature is especially useful if the taskbar is crowded with icons, or if the invention is utilized in a car or other system in which the user may be distracted by other events, thereby making it difficult to accurately select a particular icon. This aspect is illustrated in FIG. 19, which is based on the view provided in FIG. 13, in which icon 213, after being selected, is enlarged and shaded.

While one of the goals of the present invention is to simplify the launch of an application within a window of a multi-windowed GUI display, it will be appreciated that the user may also wish to display the selected application in the entire display screen, i.e., covering all windows. In any of the previously described embodiments, preferably the user is able to toggle between a full-screen view and a partial-screen view in which the selected application is displayed in one window of a multi-windowed display screen by simply tapping on the icon corresponding to the application to be re-sized. Thus, for example, if the GUI display currently shows the screen shown in FIG. 2, by tapping on icon 205 the user can enlarge the navigation screen such that it covers the entire display screen (e.g., both upper window 215 and lower window 217). Tapping the same icon again will re-size the navigation screen such that it only covers lower window 217. Furthermore, in at least one embodiment if the user wishes to launch an application in a full-screen mode, instead of using the visual cue approach described above relative to FIGS. 3-12 or the touch-and-slide approach described above relative to FIGS. 13-18, the user simply double taps (or double clicks) the icon associated with the desired application.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore, the disclosures and descriptions herein are intended to be illustrative, but not limiting, of the scope of the invention.

What is claimed is:

1. A vehicular interface system for providing access to a plurality of vehicular subsystems, the vehicular interface system comprising:
   a display;
   a memory; and
   a processor operably coupled to the display and the memory, where the memory includes instructions for causing the processor to:
      display a graphical user interface (GUI) including a taskbar in a first portion of the GUI;
      display a plurality of icons within the taskbar, wherein each of the plurality of icons represents a corresponding one of a plurality of applications;
      display a plurality of windows in a second portion of the GUI, wherein each of the plurality of windows is pre-sized;
      receive a user selection of a selected icon, wherein the selected icon is one of the plurality of icons located within the taskbar;
      determine, based on user input, that the selected icon is being dragged from an initial location on the taskbar;
      display a semi-transparent overlay, corresponding to an application to be launched, on at least one window of the plurality of windows as the selected icon is being dragged within the at least one window; and
      determine, based on further user input, that the selected icon has been released by a user within a selected window of the plurality of windows and, in response, launch the application in the selected window, wherein the application provides at least one of control options or monitoring information relating to a vehicular subsystem of the plurality of vehicular subsystems.

2. The vehicular interface system of claim 1, wherein the GUI comprises a touch-screen, wherein receiving a user selection of the selected icon includes determining that the user is touching the selected icon on the touch-screen, and wherein determining that the selected icon has been released includes determining that the user is no longer touching the selected icon on the touch-screen.

3. The vehicular interface system of claim 1, wherein receiving a user selection of the selected icon includes determining that the user is placing a cursor over the selected icon with an external controller and performing a click-and-hold operation with a controller button of the external controller, and wherein determining that the selected icon has been released includes determining that the user has unclicked the controller button.

4. The vehicular interface system of claim 1, where the memory further includes instructions for causing the processor to:
   display a miniature representation of the plurality of windows on the GUI in response to the user selection of the selected icon, the miniature representation of the plurality of windows including a plurality of mini-windows corresponding to the plurality of windows and representing the plurality of windows in which the application may be launched.

5. The vehicular interface system of claim 1, wherein launching the application further comprises completely materializing the semi-transparent overlay in the selected window when the selected icon has been released.

6. The vehicular interface system of claim 1, wherein the plurality of applications includes one or more applications for controlling one or more of the plurality of vehicular subsystems.

7. The vehicular interface system of claim 1, wherein the display is mounted within a central console of a vehicle.

8. The vehicular interface system of claim 1, wherein the plurality of applications includes at least one of an entertainment system application, a navigation system application, an energy tracking application, a browser application, a camera application or a cellular communications application.

9. The vehicular interface system of claim 1, where the memory further includes instructions for causing the processor to:
   display a plurality of persistent controls on a third portion of the GUI.

10. The vehicular interface system of claim 9, wherein the plurality of persistent controls includes at least one of:
    vehicle setting controls;
    passenger cabin temperature setting controls;
    vehicle seat warmer controls;
    audio volume controls; or
    defroster controls.

11. The vehicular interface system of claim 1, where the memory further includes instructions for causing the processor to:
    alter an appearance of the selected icon after receiving the user selection of the selected icon.

12. The vehicular interface system of claim 11, wherein altering the appearance of the selected icon includes enlarging the selected icon.

13. The vehicular interface system of claim 11, wherein altering the appearance of the selected icon includes changing a color associated with the selected icon.

14. The vehicular interface system of claim 1, where the memory further includes instructions for causing the processor to:
    subsequent to launching of the application, detect a user tap on the selected icon; and
    in response to detecting the user tap, toggle the selected window from a first window size to a second window size, wherein the second window size covers substantially all of the second portion of the GUI.

15. The vehicular interface system of claim 1, where the memory further includes instructions for causing the processor to:
   subsequent to launching of the application, detect a double tap on the selected icon; and
   in response to detecting the double tap, toggle the selected window from a first window size to a full screen mode.

16. A computer readable non-transitory memory comprising:
   at least one memory section that stores operational instructions that, when executed by a processor of a vehicular interface system including a display, causes the processor to:
      display a graphical user interface (GUI), on the display, including a taskbar in a first portion of the GUI;
      display a plurality of icons within the taskbar, wherein each of the plurality of icons represents a corresponding one of a plurality of applications;
      display a plurality of windows in a second portion of the GUI, wherein each of the plurality of windows is pre-sized;
      receive a user selection of a selected icon, wherein the selected icon is one of the plurality of icons located within the taskbar;
      determine, based on user input, that the selected icon is being dragged from an initial location on the taskbar;
      display a semi-transparent overlay, corresponding to an application to be launched, on at least one window of the plurality of windows as the selected icon is being dragged within the at least one window; and
      determine, based on further user input, that the selected icon has been released by a user within a selected window of the plurality of windows and, in response, launch the application in the selected window, wherein the application provides at least one of control options or monitoring information relating to a vehicular subsystem of a plurality of vehicular subsystems.

17. The computer readable non-transitory memory of claim 16, wherein the at least one memory section stores further operational instructions for causing the processor to:
   display a miniature representation of the plurality of windows on the GUI in response to the user selection of the selected icon, the miniature representation of the plurality of windows including a plurality of mini-windows corresponding to the plurality of windows and representing the plurality of windows in which the application may be launched.

18. The computer readable non-transitory memory of claim 16, wherein the at least one memory section stores further operational instructions for causing the processor to:
   display a plurality of persistent controls on a third portion of the GUI.

19. The computer readable non-transitory memory of claim 16, wherein the at least one memory section stores further operational instructions for causing the processor to:
   subsequent to launching of the application, detect a user tap on the selected icon; and
   in response to detecting the user tap, toggle the selected window from a first window size to a second window size, wherein the second window size covers substantially all of the second portion of the GUI.

20. The computer readable non-transitory memory of claim 16, wherein the at least one memory section stores further operational instructions for causing the processor to:
   subsequent to launching of the application, detect a double tap on the selected icon; and
   in response to detecting the double tap, toggle the selected window from a first window size to a full screen mode.

* * * * *